United States Patent
Kratmann et al.

(10) Patent No.: US 11,649,807 B2
(45) Date of Patent: May 16, 2023

(54) HEATING ARRANGEMENT FOR BONDING A PROTECTIVE SHELL TO A WIND TURBINE BLADE AND METHOD FOR BONDING A PROTECTIVE SHELL TO A WIND TURBINE BLADE

(71) Applicant: Siemens Gamesa Renewable Energy A/S, Brande (DK)

(72) Inventors: Kasper Koops Kratmann, Horsens (DK); Jason Stege, Vejle (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/251,248

(22) PCT Filed: May 23, 2019

(86) PCT No.: PCT/EP2019/063345
§ 371 (c)(1),
(2) Date: Dec. 11, 2020

(87) PCT Pub. No.: WO2019/238378
PCT Pub. Date: Dec. 19, 2019

(65) Prior Publication Data
US 2021/0246883 A1    Aug. 12, 2021

(30) Foreign Application Priority Data
Jun. 12, 2018   (EP) .................................... 18177212

(51) Int. Cl.
*B32B 37/06* (2006.01)
*B32B 37/10* (2006.01)
(Continued)

(52) U.S. Cl.
CPC .............. *F03D 80/50* (2016.05); *B23P 6/005* (2013.01); *H05B 3/00* (2013.01); *F05B 2230/80* (2013.01);
(Continued)

(58) Field of Classification Search
None
See application file for complete search history.

(56) References Cited

U.S. PATENT DOCUMENTS 5,374,388 A * 12/1994 Frailey ................ B29C 33/3821
 264/257
10,113,531 B2 * 10/2018 Caruso .................... B29C 73/10
(Continued)

FOREIGN PATENT DOCUMENTS

CN    103946013 A    7/2014
CN    105283303 A    1/2016
(Continued)

OTHER PUBLICATIONS

Written Opinion of the International Searching Authority for International Application No. PCT/EP2019/063345 (dated Year: 2020).*
(Continued)

*Primary Examiner* — Joseph M. Pelham
(74) *Attorney, Agent, or Firm* — Schmeiser, Olsen & Watts LLP (57) ABSTRACT

Providing is a heating arrangement for bonding a protective shell to a wind turbine blade, including a heating blanket with a first portion and a second portion of a heatable structure, wherein the first portion and the second portion adjoin at a fold of the heating blanket, wherein the fold is curved equally or substantially equally to a curvature of an edge of the wind turbine blade or of a segment of an edge of the wind turbine blade, wherein the heating blanket is mountable to a surface of the wind turbine blade in such (Continued)

manner that the fold abuts the edge or the segment of the edge and that the first portion and the second portion each abuts the surface of the wind turbine blade.

20 Claims, 5 Drawing Sheets (51) Int. Cl.
*H05B 3/28* (2006.01)
*F03D 80/50* (2016.01)
*B23P 6/00* (2006.01)
*H05B 3/00* (2006.01)
*H05B 3/14* (2006.01)

(52) U.S. Cl.
CPC ............... *H05B 3/148* (2013.01); *H05B 3/28* (2013.01); *H05B 3/283* (2013.01); *H05B 2203/014* (2013.01)

(56) References Cited

U.S. PATENT DOCUMENTS

| 2010/0024185 | A1* | 2/2010 | Mayabb ............... B29C 73/30 29/402.03 |
| 2014/0317925 | A1* | 10/2014 | Muschke ............. B29C 73/34 219/494 |
| 2016/0046088 | A1 | 2/2016 | Haag et al. |
| 2016/0338151 | A1* | 11/2016 | Lindskog ............. F03D 80/40 |
| 2017/0058860 | A1 | 3/2017 | Caruso et al. |
| 2017/0058862 | A1* | 3/2017 | Caruso ............. B29C 66/72141 |
| 2017/0074236 | A1* | 3/2017 | Hynum ................ F03D 1/0675 |
| 2017/0074238 | A1* | 3/2017 | Tobin .................. B29C 65/148 |
| 2017/0080653 | A1* | 3/2017 | Caruso ................ B29C 33/74 |
| 2018/0238299 | A1* | 8/2018 | Tobin .................. B29C 66/43 |
| 2019/0153993 | A1* | 5/2019 | Tobin .................. F03D 1/0675 |
| 2019/0195202 | A1* | 6/2019 | Kirkegaard ......... B29C 66/1122 |
| 2020/0080545 | A1* | 3/2020 | Cao van Truong ..... F03D 80/40 |
| 2020/0232445 | A1* | 7/2020 | Lindskog ............. B29C 73/34 |
| 2021/0062784 | A1* | 3/2021 | Tangager ............. F03D 13/10 |
| 2021/0129463 | A1* | 5/2021 | Spalding ............. B29C 73/04 |
| 2022/0055319 | A1* | 2/2022 | Rodwell .............. B29C 70/42 |

FOREIGN PATENT DOCUMENTS

| EP | 1962562 A1 | 8/2008 |
| EP | 3299156 A1 | 3/2018 |
| WO | WO 2018/051153 A1 | 3/2018 |
| WO | WO 2018/060298 A1 | 4/2018 |

OTHER PUBLICATIONS

European Search Report and Written Opinion of the European Searching Authority dated Dec. 13, 2018 for Application No. 18177212.0.

PCT International Search Report and Written Opinion of International Searching Authority dated Sep. 19, 2019 corresponding to PCT International Application No. PCT/EP2019/063345.

* cited by examiner

HEATING ARRANGEMENT FOR BONDING A PROTECTIVE SHELL TO A WIND TURBINE BLADE AND METHOD FOR BONDING A PROTECTIVE SHELL TO A WIND TURBINE BLADE

CROSS-REFERENCE TO RELATED APPLICATIONS

This application claims priority to PCT Application No. PCT/EP2019/063345, having a filing date of May 23, 2019, which is based on EP Application No. 18177212.0, having a filing date of Jun. 12, 2018, the entire contents both of which are hereby incorporated by reference.

FIELD OF TECHNOLOGY

The following relates to a heating arrangement for bonding a protective shell to a wind turbine blade and to a method for bonding a protective shell to a wind turbine blade.

BACKGROUND

The leading edges of wind turbine blades can suffer from erosion over their lifetime. The erosion can occur when particles such as rain, hail, sand, or dust impact on the leading edge of the wind turbine blade when it is rotating at high speeds. Due to this erosion, structural damage of the wind turbine blade can occur causing a decreased performance of an airfoil of the wind turbine blade.

It is therefore important to provide a means or device for repairing and protecting especially a leading edge of a wind turbine blade. Therefore, the application of erosion protective shells made of an elastomeric material is known. These protective shells can be bonded to a wind turbine blade by using an adhesive sheet consisting of a hot-melt adhesive and a heating blanket. However, especially an application of an erosion protective shell to the tip of the wind turbine blade remains difficult, since the heating blankets comprise a rectangular shape and they have to be swept around the wind turbine blade tip, which comprises a complicated, especially double-curved geometry. Since the rectangular heating blankets are not fitting properly to the shape of an edge in the tip region of the wind turbine blade, they have to be kept in place using an additional fixation means or holder like tape or plastic band.

Furthermore, an additional problem arises from the rectangular shape of the heating blankets. Due to the poor fitting of the rectangular blankets to the edges in the tip region, the blanket has to fold and forms wrinkles or folded regions in order to adapt to the geometry of the blade tip.

During heating of the adhesive used for the attachment of the erosion protective shell, excessive heat will build up in the folded regions, where two portions of the heating blanket are in contact with each other and not with the protective shell or the adhesive. During the heating process, which operates for instance at temperatures between 70° C. and 90° C., the temperature in the folds can reach 150° C. and above. This bears a significant risk of causing damage to the wind turbine blade, especially for wind turbine blades which are fabricated from glass fibre composites suffering from degradation at temperatures above approximately 100° C. Also internal structures of the wind turbine blade, for instance a foam core or the like, can be damaged by such high temperatures.

SUMMARY

An aspect relates to a heating arrangement for bonding a protective shell to a wind turbine which facilitates a repair of the wind turbine blade and reduces the risk of damage occurrence.

According to embodiments of the invention, this problem is solved by a heating arrangement comprising a heating blanket with a first portion and a second portion of a heatable structure, wherein the first portion and the second portion adjoin at a fold of the heating blanket, wherein the fold is curved equally or substantially equally to a curvature of an edge of the wind turbine blade or of a segment of an edge of the wind turbine blade, wherein the heating blanket is mountable to a surface of the wind turbine blade in such manner that the fold abuts the edge or the segment of the edge and that the first portion and the second portion each abuts the surface of the wind turbine blade.

Due to the curvature of the fold of the heating blanket, an arrangement of the heating blanket on the edge of the wind turbine blade or to the segment of the edge of the wind turbine blade is advantageously facilitated. This curvature of the fold between the first portion and the second portion of the heatable structure is especially advantageous for heating blankets used for a repair of a tip region of the wind turbine blade, since for example a leading edge of a wind turbine blade exhibits the largest curvature in its tip region. Due to the shape of the heating blanket, a wrinkle-free fit of the heating blanket on the wind turbine blade is provided. The absence of wrinkles and/or folded regions in the heating blanket during the bonding process reduces significantly the risk of thermally induced damage to the wind turbine blade by avoiding an undesired overheating in regions or parts of the heating blanket.

In the mounted state of the heating blanket, thus when the heating blanket is arranged on the wind turbine blade, the first and the second portions of the heatable structure are abutting the surface smoothly without wrinkle formation, folded regions or creases. When the heating blanket is arranged on an edge or a segment of an edge of the wind turbine blade, the first portion can cover a first segment of the surface of the wind turbine blade and the second portion can cover a second segment of the surface of the wind turbine blade, wherein the first and the second segment are on opposing sides of the edge or the segment of the edge of the wind turbine blade. In the mounted state, the heating blanket wraps the wind turbine blade partly and covers the edge or the segment of the edge of the wind turbine blade. Additionally, also a segment of the surface of the wind turbine blades is covered on both sides of the edge by the first and the second portion of the heatable structure.

In embodiments of the invention, the heating blanket of the heating arrangement comprises an elongated shape, wherein a tip-side end of the heating blanket, which is arranged towards a tip of the wind turbine blade in a mounted state of the heating blanket, comprises a smaller width than a hub-side end of the heating blanket, which is arranged towards a hub-side end of the wind turbine blade in the mounted state of the heating blanket. The usage of a tip side end of the heating blanket with a smaller width than the hub-side end of the heating blanket allows an advantageous fitting of the heating blanket to the wind turbine blade, since the width of the wind turbine blade decreases in the tip region towards an apex of the tip. A width of the heating blanket, which decreases from the hub-side end towards the tip-side end, is especially advantageous for a heating blanket that is used for repairing a segment of an edge of the wind turbine blade expanding from the apex of the tip of the blade to a position closer to the hub-side end of the blade.

The heatable structure comprises a carrier layer and at least one electrical heatable filament and/or at least one electrically heatable grid structure attached to and/or within at least one carrier layer. Electrical heating, or resistive heating, respectively, can be used for heating by applying an electrical current which flows through the at least one heatable filament and/or the at least one electrically heatable grid structure. For application of such a current, it may be provided that the heating blanket comprises one or more connection means or connectors, especially cables, which allow the connection of the heating blanket to an electrical power source. The heatable structure can comprise one or more electrically heatable filaments that are connected in series or in parallel. Also a grid structure comprising a plurality of filaments connected in parallel and/or in series can be used. The electrically heatable filament and/or the electrically heatable grid structure can consist of metal.

The at least one electrically heatable filament and/or the at least one electrically heatable grid structure of the heatable structure can be attached to the at least one carrier layer of the heatable structure. It is also possible, that the at least one heatable filament and/or the at least one electrically heatable grid structure are attached within the at least one carrier layer. An attachment within the at least one carrier layer can be realized for instance by arranging the heatable filament and/or the heatable grid structure between two carrier layers of a plurality of carrier layers and/or by embedding of the heatable filament and/or the heatable grid structure in a material of the at least one carrier layer.

The at least one carrier layer can consist of or include a flexible material, especially silicone. Also other flexible material like rubber, fabric and/or cloth is possible. By the usage of a flexible material for the carrier layer of the heatable structure, both the application of the heating blanket to the wind turbine and the fitting of the heating blanket to the wind turbine blade is improved.

In embodiments of the invention, the at least one carrier layer is airtight, wherein the heating blanket comprises a vacuum seal attached circumferentially at the outer edges of the heating blanket to the carrier layer. With an airtight carrier layer, the heating blanket can be pressed to the surface, so that air, which is in between the heating blanket and the wind turbine blade, a protection shell and/or an adhesive layer, respectively, can be removed. By using for instance a silicone carrier layer, in which the heatable structure is embedded, a sticking of the heating blanket to the wind turbine blade and/or the protective shell can be achieved. If the air underneath the heating blanket is removed at least partially, the heat transfer from the heating blanket to a heat-activatable adhesive sheet placed between the wind turbine blade and the protection shell is improved by providing a more homogeneous heat distribution and a more uniform temperature distribution.

Additionally, the heating arrangement can comprise at least one vacuum pump, which is attachable to at least one valve of the heating blanket to evacuate a volume between the heating blanket and the wind turbine blade. Of course, the heat-activatable adhesive sheet and/or the protective shell can be arranged as well in between the wind turbine blade and the heating blanket. By usage of the vacuum pump, which can be connected to the valve of the heating blanket, the vacuum can be created underneath the heating blanket, which further improves the heat transfer from the heating blanket to the wind turbine blade and/or the heat activatable adhesive sheet as well. The vacuum seal of the heating blanket can be casted one-piece with the carrier layer, especially with a silicone carrier layer. The heating blanket can comprise more than one valve to which one or more vacuum pumps can be attached.

Alternatively, it is possible that the heating arrangement comprises an evacuatable vacuum bag and at least one vacuum pump, wherein the vacuum bag is arrangeable in such manner that at least the area of the wind turbine blade, which comprises the edge or the segment of the edge, and the heating blanket in its mounted state are enveloped by the vacuum bag, wherein the at least one vacuum pump is connectable to at least one valve of the vacuum bag. The vacuum bag can comprise for instance a sealing lip, which is arranged circumferentially on an opening of the bag so that the opening, which is used to overlay the vacuum bag on the wind turbine blade and the heating blanket in its mounted state. The vacuum bag can be made of an airtight material, such as plastic, rubber, or an airtight fabric or the like. The vacuum bag comprises a valve, so that the inner volume of the vacuum bag can be evacuated using a vacuum pump connected to the valve. A sealing lip attached circumferentially on an opening of the bag seals the vacuum bag against itself or the wind turbine blade, respectively. By applying a vacuum to the vacuum bag, also the air underneath the heating blanket and/or in between an adhesive sheet and a protective shell arranged underneath the heating blanked is removed. Thus, the heat transfer is improved, since an increased amount of heat can be transferred by conduction instead of convection.

In embodiments of the invention, the heating arrangement can comprise a controller connectable or connected to the heatable structure, wherein the heatable structure comprises at least one temperature sensor, especially a Pt100-resistor, wherein the controller is configured to control a temperature of the heatable structure and/or to heat the heatable structure according to a predetermined temporal temperature characteristic. The controller can be for instance a part of the blanket or it can be an external controller, which is connectable to the blanket via cables. The controller can be connected to both the at least one temperature sensor of the heatable structure and to one or more power connectors of the heatable structure, which enable an electrically heating of the heatable structure by the controller. The controller can be a PID-controller configured for regulating the temperature of the heatable structure or the heating blanket, respectively. It is also possible that a micro processor-based controller is used, which allows for instance a heating of the heatable structure according to a predetermined temporal temperature characteristic, so that over time, different temperatures and/or different temperature gradients can be created by the heatable structure or the heating blanket, respectively.

In an embodiment, the heatable structure comprises a plurality of individually heatable zones, wherein at least one temperature sensor of the heatable structure is assigned to each zone, wherein the temperature of each zone is individually controllable and/or wherein each zone is heatable according to an individual predetermined temporal temperature characteristic. The individually heatable zones can be realised for instance by providing separately heatable filaments and/or separately heatable grids to each zone, so that they can be heated separately and independently from each other by the controller. For different zones, different temperatures can be used during heating and it may be provided that each zone is heatable according to an individual predetermined temporal temperature characteristic. In a mounted state of the heating blanket, each of the individually heatable zones aligns the surface of the wind turbine blade in a different location, so that by the heatable structure or the heating blanket, respectively, a special temperature gradient can be applied.

The heatable zones are in the first portion of the heatable structure and/or in the second portion of the heatable structure. The heating zone can be in both the first and the second zone, so that it encompasses the edge of the wind turbine blade. Different zones can be arranged adjacently to each other, so that they lay along an axial direction of the wind turbine blade in the mounted state of the heating blanket. Different heating zones and therefore different temperatures and/or different temporal temperature characteristics can be provided along the axial direction of the wind turbine blade. It is also possible that some or all of the heating zones are provided in either the first or the second zone, so that each surface adjoining the edge of the wind turbine blade can be heated with different temperatures and/or according to different temporal temperature characteristics.

In an embodiment, the heating blanket comprises an individually heatable tip zone, which abuts at least partially an apex of the tip of the wind turbine blade in the mounted state of the heating blanket. The tip zone can comprise for instance an area within a length of approximately 30 cm in the axial direction of the wind turbine blade. The tip zone can be at the tip side end of the heating blanket in its mounted state. The remainder of the heatable structure can comprise one or more, especially axially arranged, heatable zones. By providing an individually heatable tip zone, the tip of the wind turbine blade can be heated with a different temperature than the rest of the wind turbine blade covered by the heating blanket. It is possible that for instance underneath an outer shell of the wind turbine blade, a foam core is provided in the tip area, wherein the rest of the blade is substantially hollow. By providing the individually heatable tip zone, the structure variations in the blade can be considered, so that locally diverging heat responses of the wind turbine blade can be accounted during heating.

A method for bonding a protective shell to a wind turbine blade, especially for repair of a leading edge of the wind turbine blade, according to embodiments of the invention comprises the following steps:
  arranging a protective shell or a protective shell and an adhesive sheet to an edge or a segment of an edge of the wind turbine blade,
  using a heating arrangement according to one of the preceding claims and mounting a heating blanket of the heating arrangement to an edge or a segment of an edge of the wind turbine blade, so that a fold of the heating blanket abuts the edge or the segment of the edge and a first portion and a second portion of a heatable structure of the heating blanket each abuts the surface of the wind turbine blade,
  heating the heating blanket.

For bonding a protective shell to a wind turbine blade, either a protective shell and an adhesive sheet or a protective shell comprising a layer of heat activatable adhesive is arranged to the edge or the segment of the edge of the wind turbine blade. By providing a protective shell to the edge of the wind turbine blade, the surface of the wind turbine blade and/or its airfoil can be repaired, so that the aerodynamics of the wind turbine blade are improved. Besides for repair, also a bonding of the protective shell during a fabrication of the wind turbine blade is possible.

In order to activate the adhesive, a heating arrangement according to embodiments of the invention is used and the heating blanket is mounted to the edge of the segment of the edge of the wind turbine blade, so that the fold of the heating blanket abuts the edge or the segment of the edge and the first portion and the second portion of the heatable structure of the heating blanket each abuts the surface of the wind turbine blade. After arranging the heating blanket, a heating of the heating blanket is performed to activate the adhesive for permanently bonding the protective shell to the wind turbine blade. The repair can occur for instance in the tip region of a wind turbine blade. It is possible that the heating blanket is heated to a predetermined temperature and/or that it is heated according to a predetermined temporal temperature characteristic.

In an embodiment of the method according to the invention, a heating blanket comprising a heatable structure with a plurality of individually heatable zones, wherein at least one temperature sensor of the heatable structure is assigned to each zone, is used, wherein the temperature of each zone is controlled individually and/or wherein each zone is heated according to an individual predetermined temporal temperature characteristic. Thereby, different heatable zones of the heatable structure can be used, as described in the foregoing in relation to the heating arrangement. The heating blanket used for the inventive method comprises an individually heatable tip zone at the tip side end of the heating blanket, so that especially for the tip area of the blade another temperature can be used than for the rest of the blade covered by the heating blanket. Of course, also three or more individually heatable zones can be provided by the heating blanket, so that a spatial temperature gradient can be created by the heatable structure or the heating blanket, respectively. Advantageously, the temperatures of the zones and/or their temporal temperature characteristics can be adjusted for instance to an internal structure of the wind turbine blade.

It is possible that a heating blanket comprising at least one airtight carrier layer and a vacuum seal attached circumferentially at the outer edges of the heating blanket to the carrier layer is used, wherein at least one vacuum pump is attached to at least one valve of the heating blanket and a volume between the heating blanket and the wind turbine blade is evacuated by the vacuum pump.

By evacuating the volume underneath the heating blanket or between the heating blanket and the wind turbine blade and/or the protective shell and/or the adhesive sheet, respectively, the heat conduction from the heating blanket to the wind turbine blade and/or to the adhesive sheet used for bonding the protective shell to the edge of the wind turbine blade is improved.

Alternatively, it is possible that an evacuatable vacuum bag and at least one vacuum pump are used, wherein the vacuum bag is arranged in such manner that at least the area of the wind turbine blade, which comprises the edge of the segment of the edge, and the mounted heating blanket are enveloped by the vacuum bag, wherein the at least one vacuum pump is connected to at least one valve of the vacuum bag and the vacuum bag is evacuated by the vacuum pump.

Also by arranging the vacuum bag, which covers the used heating blanket and a part of the wind turbine blade, especially a tip segment of the wind turbine blade, a vacuum can be created underneath the heating blanket to improve the heat transfer.

The details, features and advantages describes for the heating arrangement according to embodiments of the invention apply correspondingly for the method according to embodiments of the invention.

BRIEF DESCRIPTION

Some of the embodiments will be described in detail, with references to the following Figures, wherein like designations denote like members, wherein.

DETAILED DESCRIPTION

Figure 10:
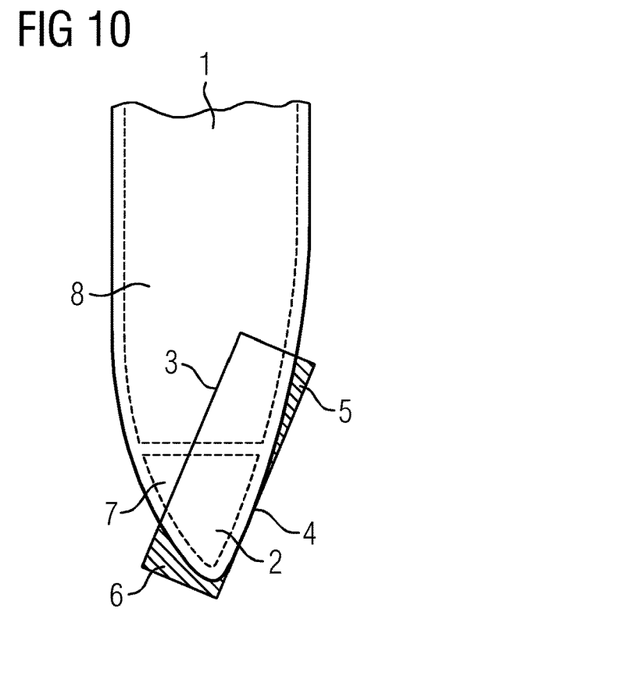
FIG. 10 shows a heating blanket according to the state of the art mounted to a wind turbine blade.

In FIG. 10, a detail of a wind turbine blade 1 is shown. In the tip area 2 of the wind turbine blade, a rectangular heating blanket 3 according to the state of the art is mounted to a segment of a leading edge 4 of the wind turbine blade 1. Due to its rectangular shape, the heating blanket 3 exhibits folded regions 5, 6. When the heating blanket 3 is heated, the temperature in the folded regions 5, 6 is higher than in the rest of the heating blanket 3 abutting the surface of the wind turbine blade 1. The rectangular shape of the heating blanket 3 can also cause the occurrence of wrinkles in the heating blanket which also cause uneven temperature distribution in the heating blanket. Due to the uneven temperature distribution and to the higher temperature in the folded regions 5, 6, there is a risk of temperature induced damage to the wind turbine blade 1 during the usage of the rectangular heating blanket 3 for repair of the wind turbine blade 1. Higher temperatures can cause for instance a degradation of a fibre composite material of the wind turbine blade 1 and/or a degradation of a foam core 7, which may be present inside the wind turbine blade 1, for instance in the tip region 2, wherein the remainder of the wind turbine blade 1 comprises a hollow volume 8.

Figure 1:
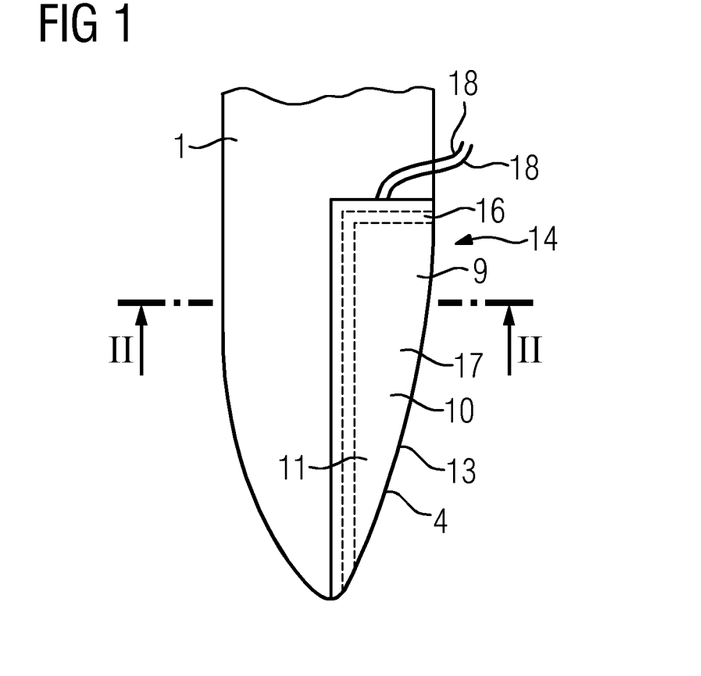
FIG. 1 shows a schematic tow view of a first embodiment of a heating arrangement.

In FIG. 1, a heating blanket 9 of a first embodiment of a heating arrangement 14 according to the invention is shown in its mounted state. The heating blanket 9 is mounted on a leading edge 4 of the wind turbine blade 1. The heating blanket comprises a heatable structure 10. The heatable structure 10 comprises a first portion 11 and a second portion 12, which are adjoining at a fold 13 of the heating blanket. The second portion 12 abuts the opposite surface of the wind turbine blade 1 and is therefore not visible in FIG. 1. Therefore, reference is made to FIG. 2, wherein a sectional view of the heating arrangement 14 is shown. The wind turbine blade 1 comprises an outer shell 15, surrounding for instance a hollow volume 8. Furthermore, the wind turbine blade 1 comprises an adhesive layer 16 and an edge protective shell 17, which are arranged on the outer shell 15 of the wind turbine blade 1.

Figure 2:
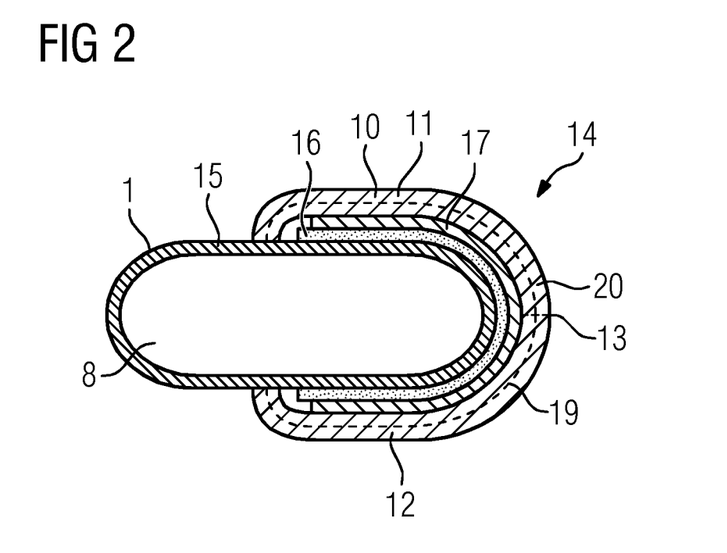
FIG. 2 shows a cut view of the first embodiment of a heating arrangement.

The heatable structure 10 of the heating blanket 9 can be heated by an electrical current, which is for instance applied via cables 18 to an electrically heatable grit structure 19 of the heatable structure 10. In FIG. 2, the electrically heatable grid structure is shown schematically at a dashed line. Additionally or alternatively to the grid structure 19, also one or more electrically heatable filaments can be used for electrically heating of the heatable structure 10.

By heating the heating blanket 9, an improved heat flow from the heatable structure 10 to the wind turbine blade 1 and especially to the adhesive layer 16 is obtained, since the fold 13 of the heating blanket between the first portion 11 and the second portion 12 of the heatable structure 10 exhibits a curvature equal or substantially equal to the curvature of the segment of the leading edge 4 on which the heating blanket 9 is arranged. Therefore, the heating blanket 9 can be mounted to the wind turbine blade without exhibition of wrinkles, creases or folded areas 5, 6. To facilitate a mounting of the heating blanket 9 to the wind turbine blade 1, the electrically heatable grid structure 19, which consist for instance of metal wires, is embedded within a carrier layer 20 made of a flexible material. The flexible material can be for instance silicone, rubber, fabric and/or cloth. Due to its flexibility, the heating blanket 9 can be wrapped around the leading edge 4 of the wind turbine blade 1 as it is shown in FIG. 2, wherein both the first portion 11 and the second portion 12 of the heatable structure 10 abut the surface of the wind turbine blade, or the protective shell 17, respectively, on both sides of the segment of the leading edge 4.

Figure 3:
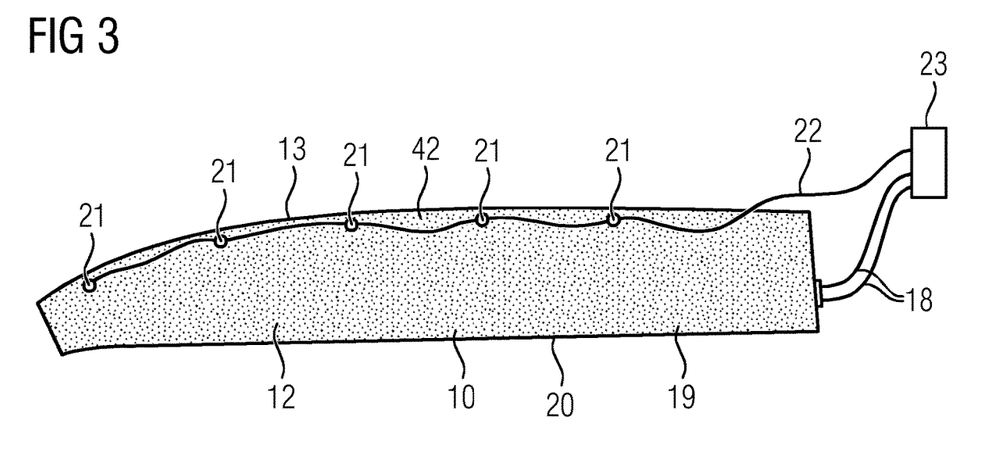
FIG. 3 shows a top view on a heating blanket.

In FIG. 3, a top view of a heating blanket 42 of a heating arrangement according to embodiments of the invention is shown, wherein for the same features the same reference numerals are used. The heating blanket 42 comprises a heatable structure 10 consisting of a grit structure 19 attached to the outer surface of a carrier layer 20. In this view, the second portion 12 of the heatable structure 10 is shown. The heatable structure 10 of the heating blanket 9 comprises a plurality of temperature sensors 21, which are located close to the fold 13 of the heating blanket 42. The temperature sensors 21 are connected by a multi-wire cable 22. The heatable structure 10 can be electrically connected via cables 18. Both the multi-wire cable 22 and the cables 18 can be connected to a controller 23. The controller 23 can measure the temperature at each of the temperature sensors 21 and can heat the heatable structure 10 in order to control the temperature of the heatable structure 10. The controller 23 can be for instance a PID-controller configured for temperature regulation. It is also possible that the controller 23 is a micro processor-based controller, which is configured to apply a temporal temperature characteristic to the heatable structure 10, so that over time, different temperatures of the heatable structure 10 can be realised. Of course, also when using a temporal temperature characteristic, a controlling of the temperature through controller 23 is possible.

Figure 4:
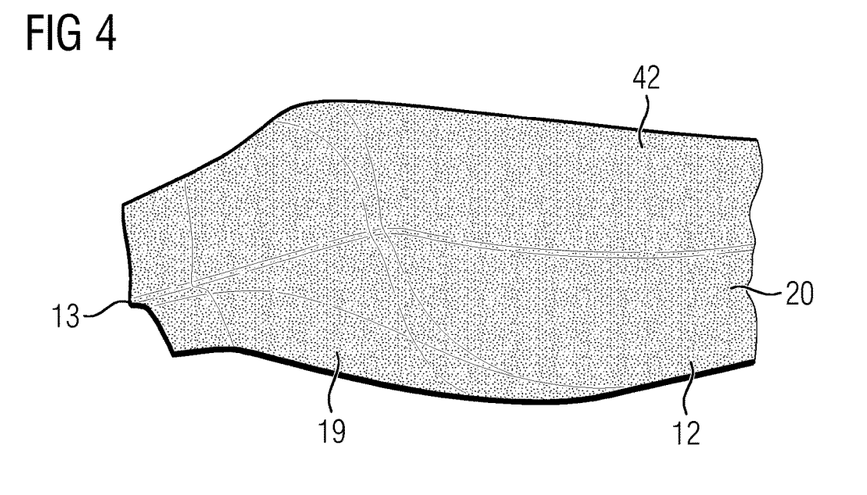
FIG. 4 shows a perspective view on a heating blanket.

FIG. 4 depicts a perspective view on the heating blanket 42. From this perspective view it is discernible that the first portion 11 and the second portion 12 of the heatable structure 10 adjoin at the fold 13 of the heating blanket 42. The inner surface of the heatable structure 10 is made by the carrier layer 20, on which outer surface a grid structure 19 is attached. When mounting the heating blanket 42, the fold 13 abuts the edge or the segment of the edge of the wind turbine blade and the first portion 11 and the second portion 12 each abut the surface of the wind turbine blade 1 as previously shown in FIG. 2.

Figure 5:
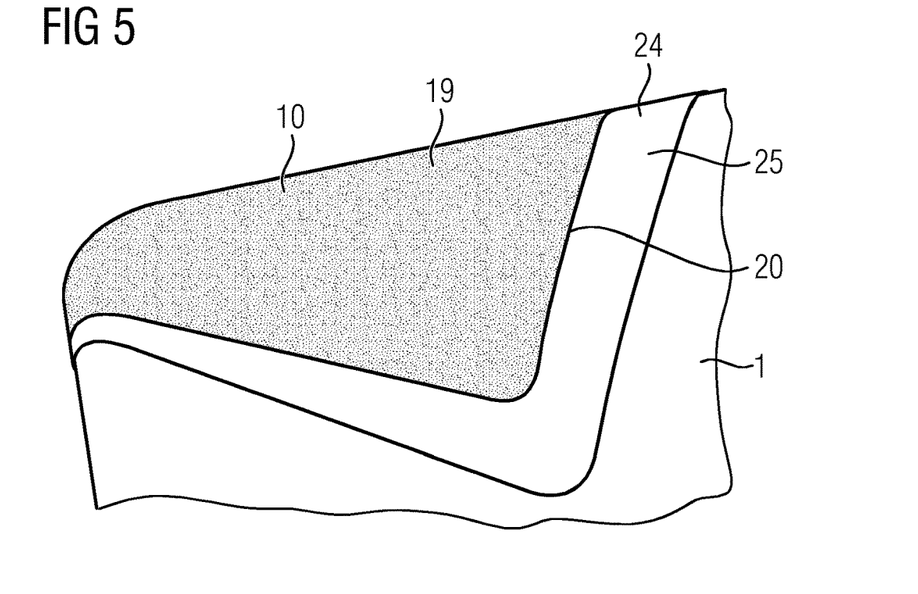
FIG. 5 shows a first perspective view of a heating blanket in its mounted state.

In FIG. 5, a heating blanket 24 of a heating arrangement according to embodiments of the invention is shown, wherein for the same features the same reference numerals are used. Also the heating blanket 24 comprises a heatable structure 10 with an electrically heatable grid structure 19 and a carrier layer 20. The heating blanket 24 is shown in its mounted state mounted on a wind turbine blade 1. The heating blanket 24 comprises a vacuum seal 25 arranged circumferentially at the outer edge of the heating blanket 24 to the carrier layer 20. Due to the vacuum seal 25, the heating blanket 24 can be pressed on the surface of the wind turbine blade 1, so that air, which is underneath the heating blanket 24, can be removed. The removal of the air underneath the heating blanket 24, a heat transfer from the heatable structure 10 to the wind turbine blade 1 can be improved since a higher amount of the heat transfer occurs by heat conduction instead of convection.

Figure 6:
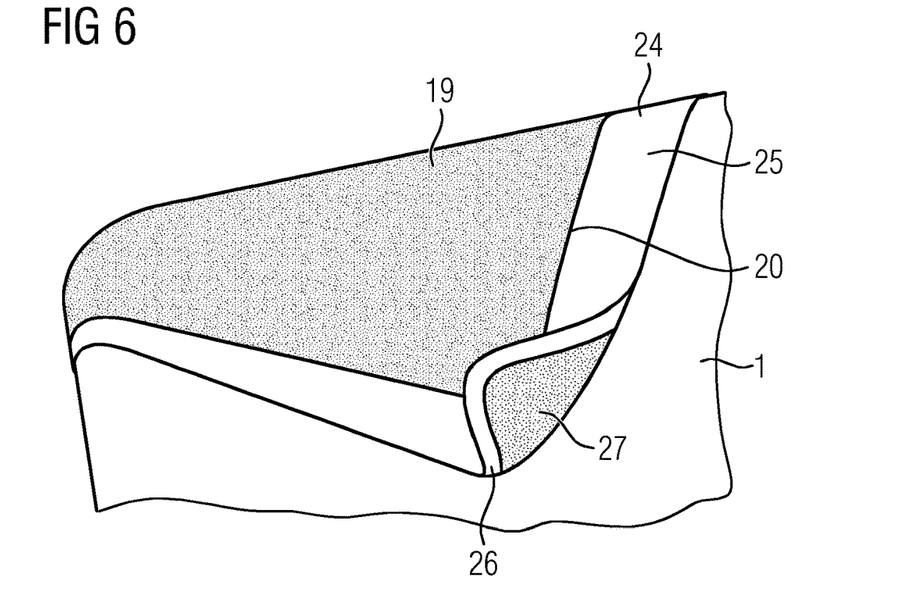
FIG. 6 shows a second perspective view of a heating blanket in its mounted state.

In FIG. 6, one corner of the heating blanket is shown in an upward bended state allowing a view on the bottom side of the vacuum seal 25, which abuts the surface of the wind turbine blade 1 in the mounted state of the heating blanket 24. In this embodiment, the vacuum seal 25 is casted one piece with the carrier layer 20. The electrically heatable grid structure 19 is attached on the carrier layer 20. Both the carrier layer 20 and the vacuum seal 25 are made of silicone. The vacuum seal 25 comprises a seam 26 with a flat surface for sealing against the surface of the wind turbine blade 1 along the circumference of the heating blanket. The inner area of the vacuum seal 25 comprises a rough surface 27, allowing the formation of a vacuum underneath the heating blanket 24 by pressing it against the wind turbine blade 1. Also the surface of a carrier layer 20, which is abutting the surface of the wind turbine blade 1, can exhibit such a rough surface 27.

Figure 7:
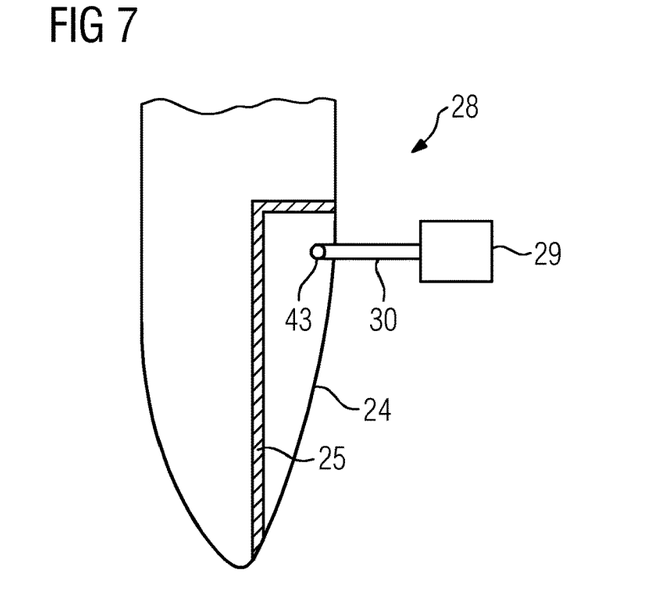
FIG. 7 shows a schematic top view of a second embodiment of a heating arrangement.

In FIG. 7, a second embodiment of a heating arrangement 28 according to the invention is shown. The heating arrangement 28 comprises the heating blanket 24 and a pump 29. The pump 29 is connected via a tube 30 to a valve 43 of the heating blanket 24. By operation of the pump 29, a vacuum can be created underneath the heating blanket 24. The outer circumference of the heating blanket 24 is sealed against the surrounding by the vacuum seal 25 as previously described.

Figure 8:
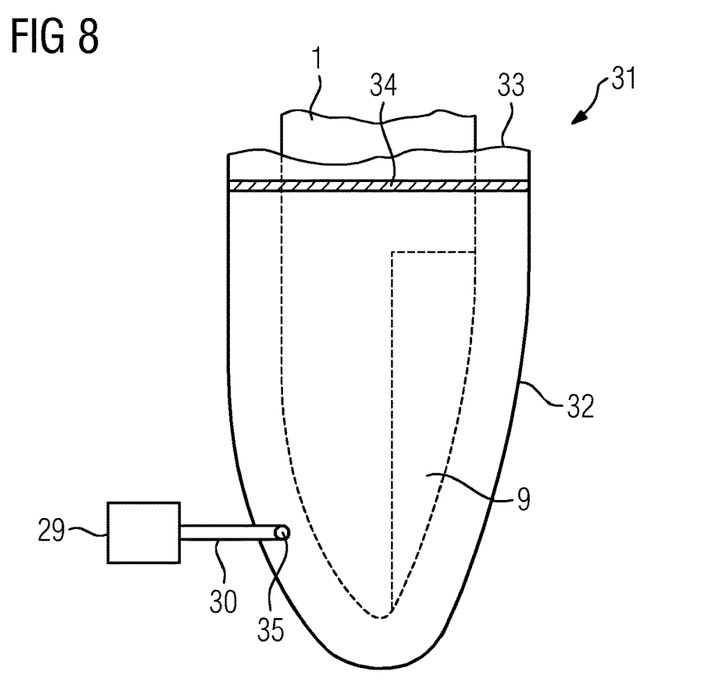
FIG. 8 shows a schematic top view on a third embodiment of a heating arrangement.

In FIG. 8, a third embodiment of a heating arrangement 31 according to the invention is shown. The heating arrangement 31 comprises the heating blanket 9 as well as the vacuum bag 32. The vacuum bag 32 can be pulled over the heating blanket 9 and a part of the wind turbine blade 1, for instance the tip area 2. The vacuum bag 32 comprises an opening 33, wherein a vacuum seal 34 is attached to the opening 33, so that the vacuum seal 34 surrounds the opening 33 circumferentially. Inside the vacuum bag 32, a vacuum can be created using the pump 29 which is connected via the tube 30 to a valve 35 of the vacuum bag 32. The opening 33 of the vacuum bag 32 is sealed against the surrounding by the vacuum seal 34. By evacuating the vacuum bag 32, a vacuum is created also underneath the heating blanket 9, so that an improved heat flow from the heating blanket 9 to the wind turbine blade 1 is obtained.

Figure 9:
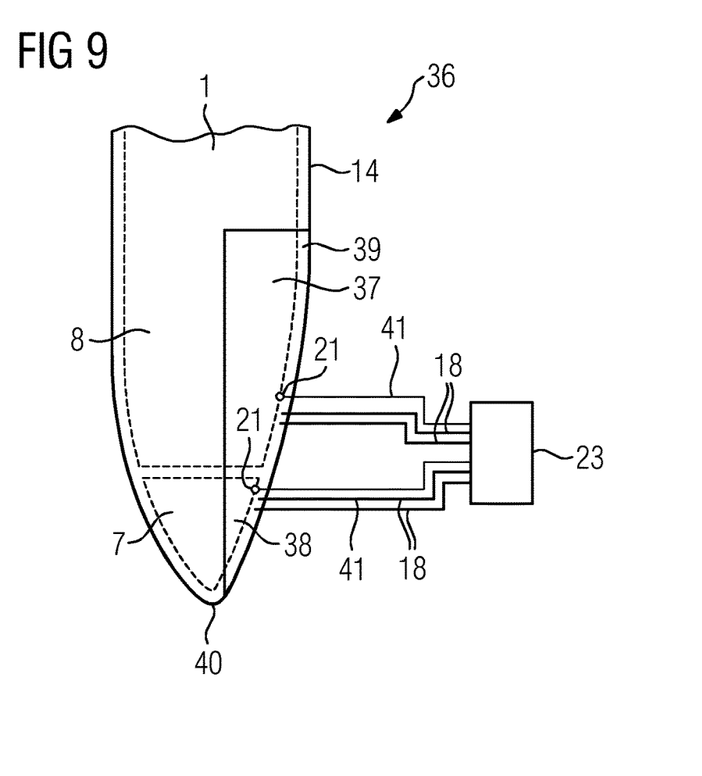
FIG. 9 shows a top view on a fourth embodiment of the heating arrangement.

In FIG. 9, a fourth embodiment of a heating arrangement 36 according to the invention is shown. The heating arrangement 36 comprises a heating blanket 37, which is depicted in its mounted state to a segment of the leading edge 14 of the wind turbine blade 1. On the inside, the wind turbine blade 1 comprises a foam core 7 close to the tip as well as a hollow volume 8 expanding from the foam core 7 to the hub side end (not shown) of the wind turbine blade 1. The heating blanket 37 comprises a first individual heatable zone 38 and a second individually heatable zone 39. The first individual heatable zone 38 is realised as a tip zone being arranged close to an apex 40 of the tip. The second individually heatable zone 39 is directed to the hub-side end of the heating blanket 37 or the wind turbine blade 1, respectively. The first individually heatable zone 38 can have for instance a length of approximately 30 cm in axial direction of the wind turbine blade 1. Both the first individually heatable zone 38 and the second individually heatable zone 39 can be heated and controlled by the controller 23. For temperature controlling, each of the zones 38, 39 comprises a temperature sensor 21, which is connected via a cable 41 to the controller 23. Each heating zone 38, 39 comprises for instance an electrically heatable grid structure, so that the temperature of each of the zones 38, 39 can be set to different values controlled separately. The application of different temperatures to the zones 38, 39 has the advantage that the part of the wind turbine blade 1, which is hollow in the inside, can be heated with a different temperature than the tip portion comprising the foam core 7. Thermally induced damage by the heating blanket 37 during bonding of a protective shell to the wind turbine blade 1 can be avoided.

For repair and/or during fabrication of the wind turbine blade 1, the adhesive layer 16 and the protective shell 17 are attached to the leading edge 14 of the wind turbine blade as shown in FIG. 2. Afterwards, by using a heating arrangement according to embodiments of the invention, the heating blanket of the heating arrangement is mounted to the leading edge 14 or to the segment of the leading edge 14 of the wind turbine blade 1, so that the fold 13 of the heating blanket abuts the edge 14 or the segment of the edge 14 and the first portion 11 and the second portion 12 of the heatable structure 10 of the heating blanket each abuts the surface of the wind turbine blade 1. Subsequently, the heating blanket is heated to activate the adhesive of the adhesive layer 16 and to permanently attach the protective shell 17 to the wind turbine blade 1. Once the adhesive of the adhesive layer 16 is cured, the heating blanket is removed from the wind turbine blade 1. Afterwards, a trimming or a grinding of the surface can be performed using respective tools or machines for creation of a smooth surface to improve the aerodynamic properties of the wind turbine blade 1.

For improvement of the heat flow during the heating, a vacuum can be applied underneath the heating blanket as already described with reference to FIGS. 7 and 8. The removal of air underneath the heating blanket improves the heat flow from the heating blanket to the wind turbine blade 1 or the adhesive layer 16, respectively, and can significantly reduce the amount of time needed for a wind turbine blade repair. Especially when performing a repair on an already installed wind turbine, a reduction of the time for repairing significantly reduces the costs of the repair. Depending on the inner structure of the wind turbine blade 1 which is repaired, a heating blanket with two or more individually heatable zones can be used adapting a temperature and/or a temporal temperature characteristic to the inner structure of the wind turbine blade improving the results of the repair and the adhesion of the protective shell 17 to the wind turbine blade 1 as described with respect to FIG. 9.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A heating arrangement for bonding a protective shell to a wind turbine blade, comprising a heating blanket with a first portion and a second portion of a heatable structure, wherein the first portion and the second portion are connected at a curved fold of the heating blanket, wherein a curvature of the curved fold is equal to or substantially equal to a curvature of an edge of the wind turbine blade or of a segment of an edge of the wind turbine blade, wherein the heating blanket is mountable to a surface of the wind turbine blade in such manner that the curved fold abuts the edge or the segment of the edge and that the first portion and the second portion each abuts the surface of the wind turbine blade.

2. The heating arrangement according to claim 1, wherein the heating blanket comprises an elongated shape, wherein a tip-side end of the heating blanket, which is arranged towards a tip of the wind turbine blade in a mounted state of the heating blanket, comprises a smaller width than a hub-side end of the heating blanket, which is arranged towards a hub-side end of the wind turbine blade in the mounted state of the heating blanket.

3. The heating arrangement according to claim 1, wherein the heatable structure comprises a carrier layer and at least one of: at least one electrically heatable filament and at least one electrically heatable grid structure at least one of attached to and within the at least one carrier layer.

4. The heating arrangement according to claim 3, wherein the at least one carrier layer consists of a flexible material, wherein the material is silicone.

5. The heating arrangement according to claim 3, wherein the at least one carrier layer is airtight, wherein the heating blanket comprises a vacuum seal attached circumferentially at the outer edges of the heating blanket to the carrier layer.

6. The heating arrangement according to claim 5, wherein the heating arrangement comprises at least one vacuum pump, which is attachable to at least one valve of the heating blanket to evacuate a volume between the heating blanket and the wind turbine blade.

7. The heating arrangement according to claim 1, wherein the heating arrangement comprises an evacuatable vacuum bag and at least one vacuum pump, wherein the vacuum bag is arrangeable in such manner that at least the area of the wind turbine blade, which comprises the edge or the segment of the edge, and the heating blanket in its mounted state are enveloped by the vacuum bag, wherein the at least one vacuum pump is connectable to at least one valve of the vacuum bag.

8. The heating arrangement according to claim 1, wherein the heating arrangement comprises a controller connectable to the heatable structure, wherein the heatable structure comprises at least one temperature sensor, wherein said at least one temperature sensor is a Pt100-resistor, wherein the controller is configured at least one of to control a temperature of the heatable structure and to heat the heatable structure according to a predetermined temporal temperature characteristic.

9. The heating arrangement according to claim 8, wherein the heatable structure comprises a plurality of individually heatable zones, wherein at least one temperature sensor of the heatable structure is assigned to each zone, wherein at least one of the temperature of each zone is individually controllable and each zone is heatable according to an individual predetermined temporal temperature characteristic.

10. The heating arrangement according to claim 9, wherein the heatable zones are at least one of in the first portion of the heatable structure and in the second portion of the heatable structure.

11. The heating arrangement according to claim 9, wherein the heating blanket comprises an individually heatable tip zone, which abuts at least partially an apex of the tip of the wind turbine blade in the mounted state of the heating blanket.

12. A method for bonding a protective shell to a wind turbine blade, especially for repair of a leading edge of the wind turbine blade, comprising the following steps:
arranging a protective shell or a protective shell and an adhesive sheet to an edge or a segment of an edge of the wind turbine blade,
providing a heating blanket with a first portion and a second portion of a heatable structure, wherein the first portion and the second portion adjoin at a curved fold of the heating blanket, wherein a curvature of the curved fold is equal to or substantially equal to a curvature of the edge of the wind turbine blade or of a segment of the edge of the wind turbine blade,
mounting the heating blanket to the edge or the segment of the edge of the wind turbine blade, so that the curved fold of the heating blanket abuts the edge or the segment of the edge and the first portion and the second portion of the heatable structure of the heating blanket each abuts the surface of the wind turbine blade, and
heating the heating blanket.

13. The method according to claim 12, wherein the heating blanket comprising the heatable structure with a plurality of individually heatable zones, wherein at least one temperature sensor of the heatable structure is assigned to each zone, is used, at least one of wherein the temperature of each zone is controlled individually and wherein each zone is heated according to an individual predetermined temporal temperature characteristic.

14. The method according to claim 12, wherein the heating blanket comprising at least one airtight carrier layer and a vacuum seal attached circumferentially at the outer edges of the heating blanket to the carrier layer is used, wherein at least one vacuum pump is attached to at least one valve of the heating blanket and a volume between the heating blanket and the wind turbine blade is evacuated by the vacuum pump.

15. The method according to claim 12, wherein an evacuatable vacuum bag and at least one vacuum pump is used, wherein the vacuum bag is arranged in such manner that at least the area of the wind turbine blade, which comprises the edge or the segment of the edge, and the mounted heating blanket are enveloped by the vacuum bag, wherein the at least one vacuum pump is connected to at least one valve of the vacuum bag and the vacuum bag is evacuated by the vacuum pump.

16. The method according to claim 12, wherein the heating blanket is mounted without wrinkles or creases.

17. The heating arrangement according to claim 1, wherein the heating blanket is mountable to the surface of the wind turbine blade such that there are no wrinkles or creases.

18. The heating arrangement according to claim 1, wherein the heating blanket has a non-rectangular shape.

19. A heating arrangement for bonding a protective shell to a wind turbine blade, comprising a heating structure with a first portion, a second portion, and a curved fold, wherein the curved fold adjoins the first portion to the second portion, wherein a curvature of the curved fold is equal to or substantially equal to a curvature of an edge of the wind turbine blade or of a segment of an edge of the wind turbine blade, such that the heating structure is mountable to a surface of the wind turbine blade with the curved fold abutting the edge or the segment of the edge, the first portion and the second portion each abutting the surface of the wind turbine blade, and without wrinkled areas in the heating structure.

20. The heating arrangement according to claim 19, wherein the heating structure has a non-rectangular shape.

* * * * *